US007007028B2

(12) United States Patent
Rashid et al.

(10) Patent No.: US 7,007,028 B2
(45) Date of Patent: Feb. 28, 2006

(54) SMART POLLER FOR OPTICAL NETWORK MANAGEMENT SYSTEMS

(75) Inventors: Hasnain Rashid, Menlo Park, CA (US); Peter G. Jones, Campbell, CA (US); Paddy Vishnubhatt, Los Altos, CA (US); Phyllis Yip, San Francisco, CA (US); Jason C. Fan, Mt. View, CA (US)

(73) Assignee: Luminous Networks, Inc., Cupertino, CA (US)

(*) Notice: Subject to any disclaimer, the term of this patent is extended or adjusted under 35 U.S.C. 154(b) by 82 days.

(21) Appl. No.: 10/746,037

(22) Filed: Dec. 23, 2003

(65) Prior Publication Data

US 2005/0135326 A1 Jun. 23, 2005

(51) Int. Cl.
*G06F 17/30* (2006.01)
*G06F 7/00* (2006.01)

(52) U.S. Cl. ........................ 707/10; 370/401; 370/412; 370/503; 709/248

(58) Field of Classification Search ................ 370/401, 370/412, 503; 709/248; 710/10
See application file for complete search history.

(56) References Cited

U.S. PATENT DOCUMENTS

| | | | | |
|---|---|---|---|---|
| 5,926,816 | A * | 7/1999 | Bauer et al. | 707/8 |
| 5,963,959 | A * | 10/1999 | Sun et al. | 707/200 |
| 6,178,425 | B1 * | 1/2001 | Brodersen et al. | 707/101 |
| 6,189,011 | B1 * | 2/2001 | Lim et al. | 707/102 |
| 6,721,285 | B1 * | 4/2004 | Carro | 370/277 |
| 6,721,742 | B1 * | 4/2004 | Uceda-Sosa et al. | 707/10 |

* cited by examiner

*Primary Examiner*—Ricky Ngo
*Assistant Examiner*—Nguyen H. Ngo
(74) *Attorney, Agent, or Firm*—Sawyer Law Group LLP

(57) ABSTRACT

A method and system for synchronizing data between a management system (MS) and network elements (NE) in an optical network utilizes a table counter and row counters for each row in a NE table, and a table counter and row counter for each row in a MS table. The NE table counter increments when a change in the NE table occurs. Each NE row counter increments when its row is changed. The MS table counter increments when a change in the MS table occurs. Each MS row counter is incremented when its row is changed. The MS polls the NE table counter and compares it with its MS table counter. If they are different, then the MS compares each NE row counter with the corresponding MS row counter. For any of the row counters that do not match, the rows between the MS table and the NE table are synchronized.

20 Claims, 6 Drawing Sheets

SMART POLLER FOR OPTICAL NETWORK MANAGEMENT SYSTEMS

FIELD OF THE INVENTION

The present invention relates to optical network, and more particularly, to the synchronization of data between network elements and the management system of the optical network.

BACKGROUND OF THE INVENTION

FIG. 1 illustrates a conventional optical network. The network 100 comprises a plurality of interconnected network rings 101. Each ring includes a plurality of network elements 102. The optical network 102 is managed by a centralized management system 103, coupled to the network 100 in any number of ways. "Network element", as used in this specification, refers to an entity capable of adding traffic to and dropping traffic from a network ring 101. Each network element 102 maintains a table 104 of data necessary for facilitating communication with other network elements. Copies 105 of these tables are maintained at the management system 103.

It is important for the data in the management system table 105 to be in sync with the data in the corresponding network element tables 104. There are two conventional ways to maintain the tables in sync. A first conventional way is for each network element 102 to send a notification to the management system 103 indicating that a row in its table 104 has changed. The management system 103 uses this notification as a trigger to synchronize it's table 105 with the network element's table 104. However, notifications can be lost. Plus, this method is not sufficiently scalable because the changes, especially configuration changes, are usually caused by the management system 103. The management system 103 thus is sent the notification unnecessarily. In addition, the management system 103 can become inundated with notifications for large networks with numerous network elements.

A second conventional way is for the management system 103 to periodically poll the data from the network element tables 104 to re-fetch the rows in the network element tables. However, if the data is voluminous, or if the network has numerous network elements, synchronizing the data is time consuming and burdensome on the network resources.

Accordingly, there exists a need for an improved method and system for synchronizing data on a management system with data on network elements in an optical network.

SUMMARY OF THE INVENTION

A method and system for synchronizing data between a management system (MS) and network elements (NE) in an optical network utilizes a table counter and row counters for each row in a NE table, and a table counter and row counter for each row in a MS table. The NE table counter increments when a change in the NE table occurs. Each NE row counter increments when its row is changed. The MS table counter increments when a change in the MS table occurs. Each MS row counter is incremented when its row is changed. The MS polls the NE table counter and compares it with its MS table counter. If they are different, then the MS compares each NE row counter with the corresponding MS row counter. For any of the row counters that do not match, the rows between the MS table and the NE table are synchronized.

DETAILED DESCRIPTION

The present invention provides an improved method and system for synchronizing data on a management system with data on network elements in an optical network. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 2 through 6 in conjunction with the discussion below.

Figure 1:
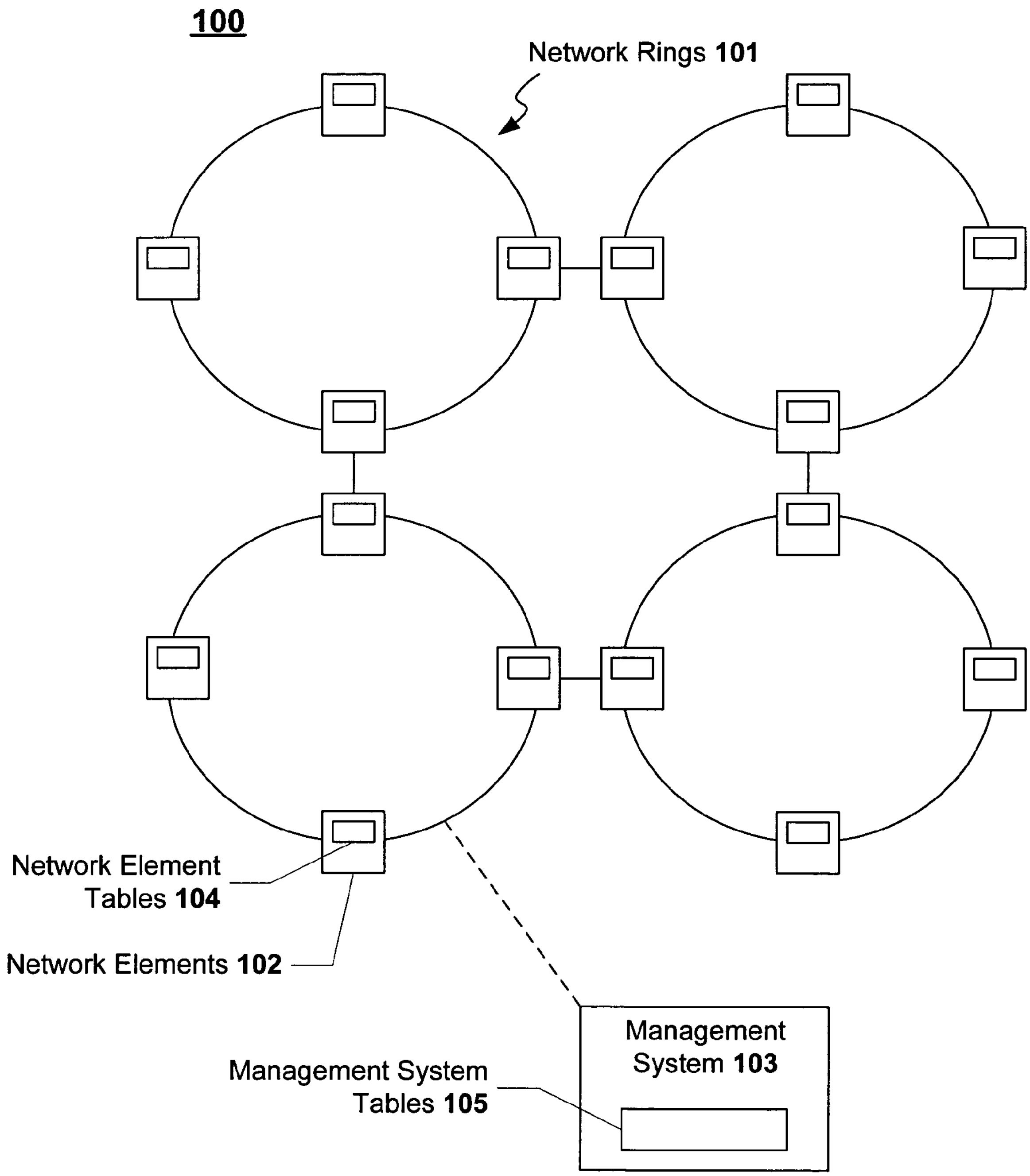
FIG. 1 illustrates a conventional optical network.
Figure 2:
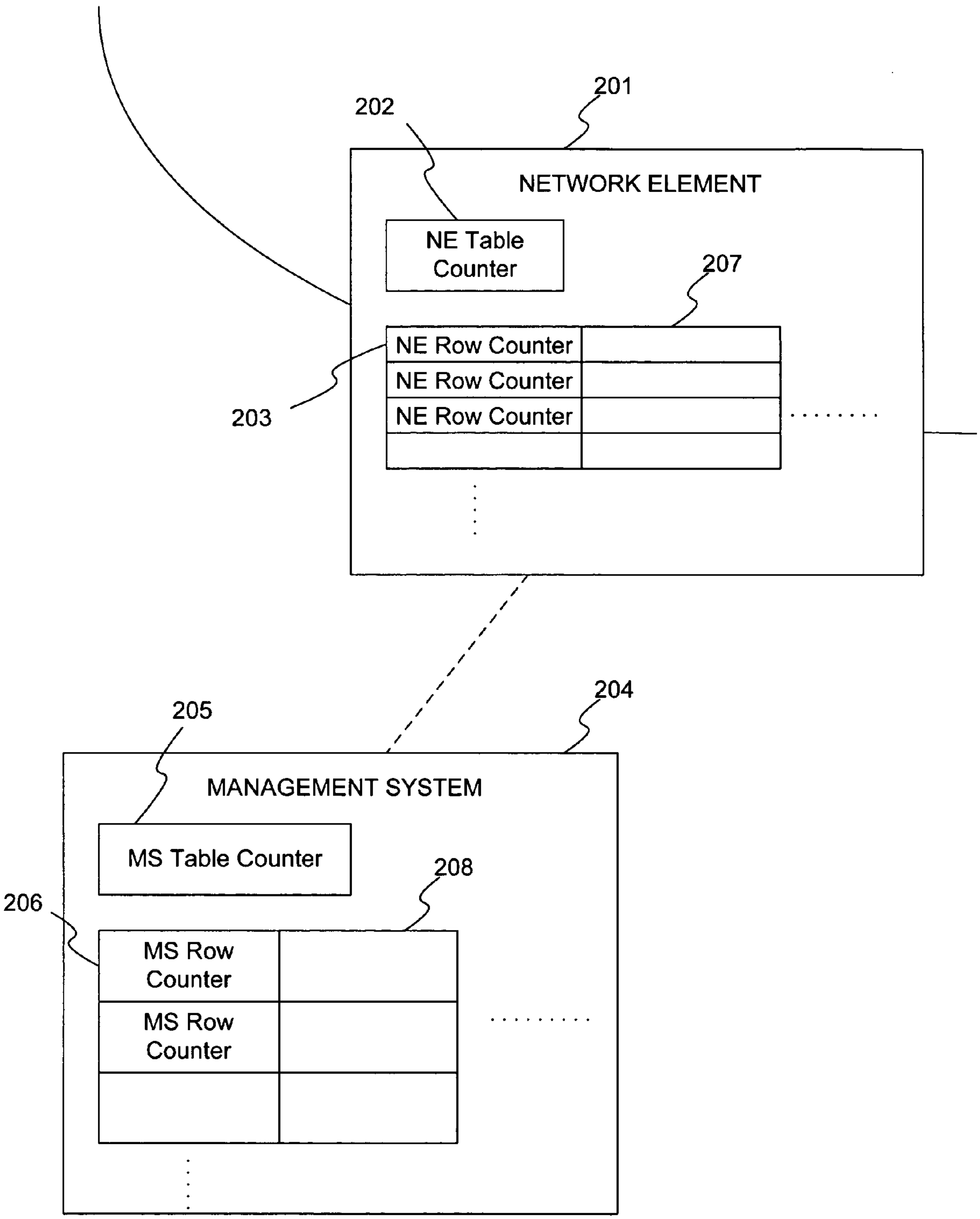
FIG. 2 illustrates a preferred embodiment of a system for synchronizing data on a management system with data on network elements in an optical network in accordance with the present invention.

FIG. 2 illustrates a preferred embodiment of a system for synchronizing data on a management system with data on network elements in an optical network in accordance with the present invention. The network comprises a plurality of network elements (NE) 201, each comprising a table counter 202 and at least one table 207 containing data. Each row in the table 207 has a row counter 203. The NE table counter 202 is incremented each time a change in the NE table 207 occurs. For the row in which the change occurs, the corresponding NE row counter 203 is incremented as well.

The network further comprises a management system 204. The management system (MS) 204 comprises a table 208 to be synchronized with of the NE table 207 and a MS table counter 205 for the MS table 208. The MS table 208 includes a row counter 206 for each row in the MS table 208.

Figure 3:
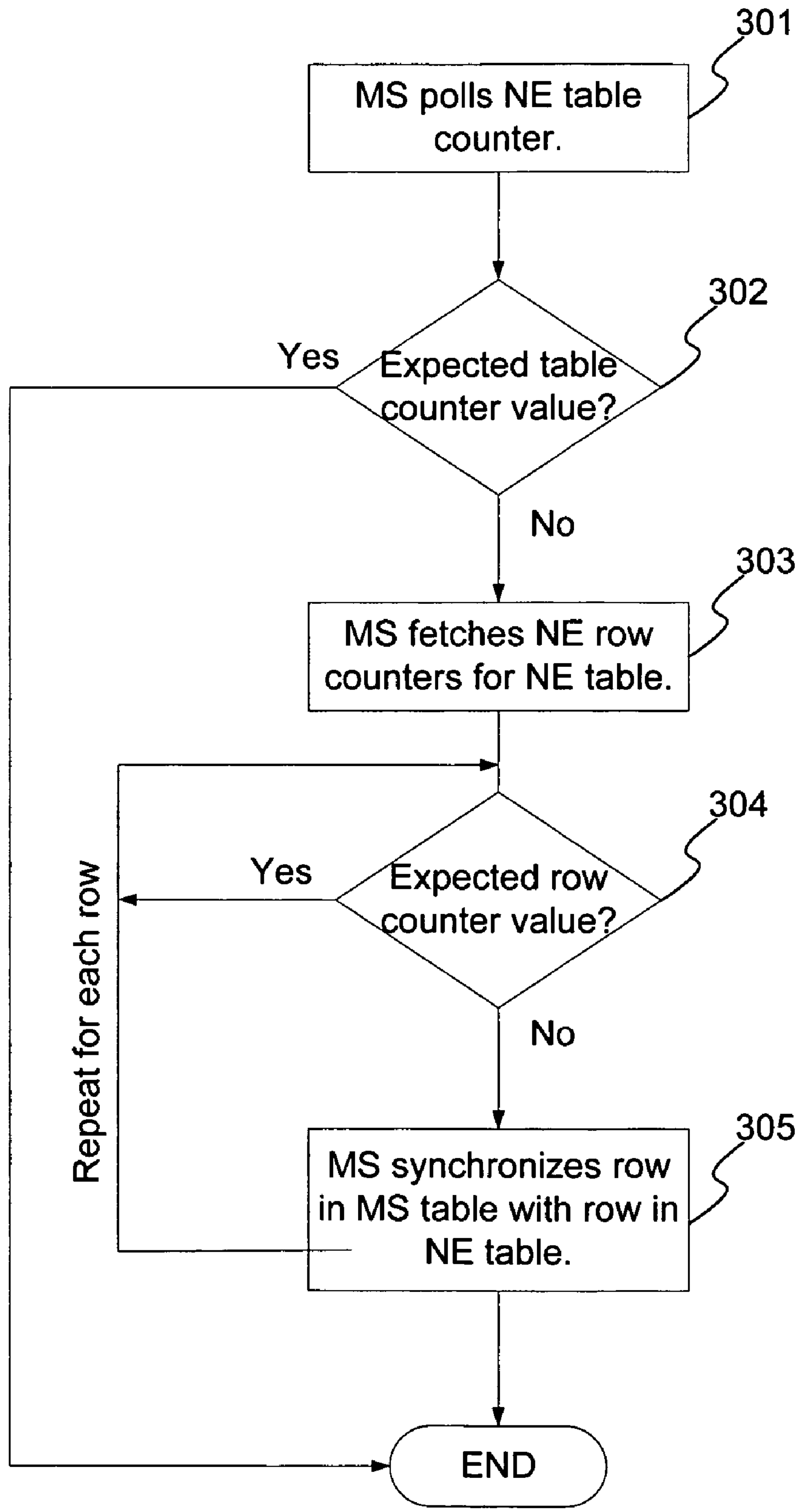
FIG. 3 is a flowchart illustrating a preferred embodiment of a method for synchronizing data on a management system with data on network elements in an optical network in accordance with the present invention.

FIG. 3 is a flowchart illustrating a preferred embodiment of a method for synchronizing data on a management system with data on network elements in an optical network in accordance with the present invention. Referring to both FIGS. 2 and 3, first, the MS 204 polls the NE table counter 202, via step 301. The MS 204 then determines if the value of the NE table counter 202 is what it expected, via step 302. If it is, then the NE table 207 has not changed since the last synchronization, and nothing further needs to be done. The MS 204 can then poll the next NE in the network. If the NE table counter 202 value is not what the MS 204 expected, then the NE table 207 has changed since the last synchronization. The MS 204 then fetches the NE row counters 203 for the NE table 207, via step 303. For each row, the MS 204 determines whether the value of its row counter 203 is what the MS 204 expected, via step 304. If it is not, then the MS 204 synchronizes the row in the MS table 208 with the corresponding row in the NE table 207, via step 305. The steps 304 and 305 are repeated for all rows of the NE table 207. The steps 301 through 305 are repeated for each network element 201 in the network that requires data synchronization with the MS 204.

Figure 4:
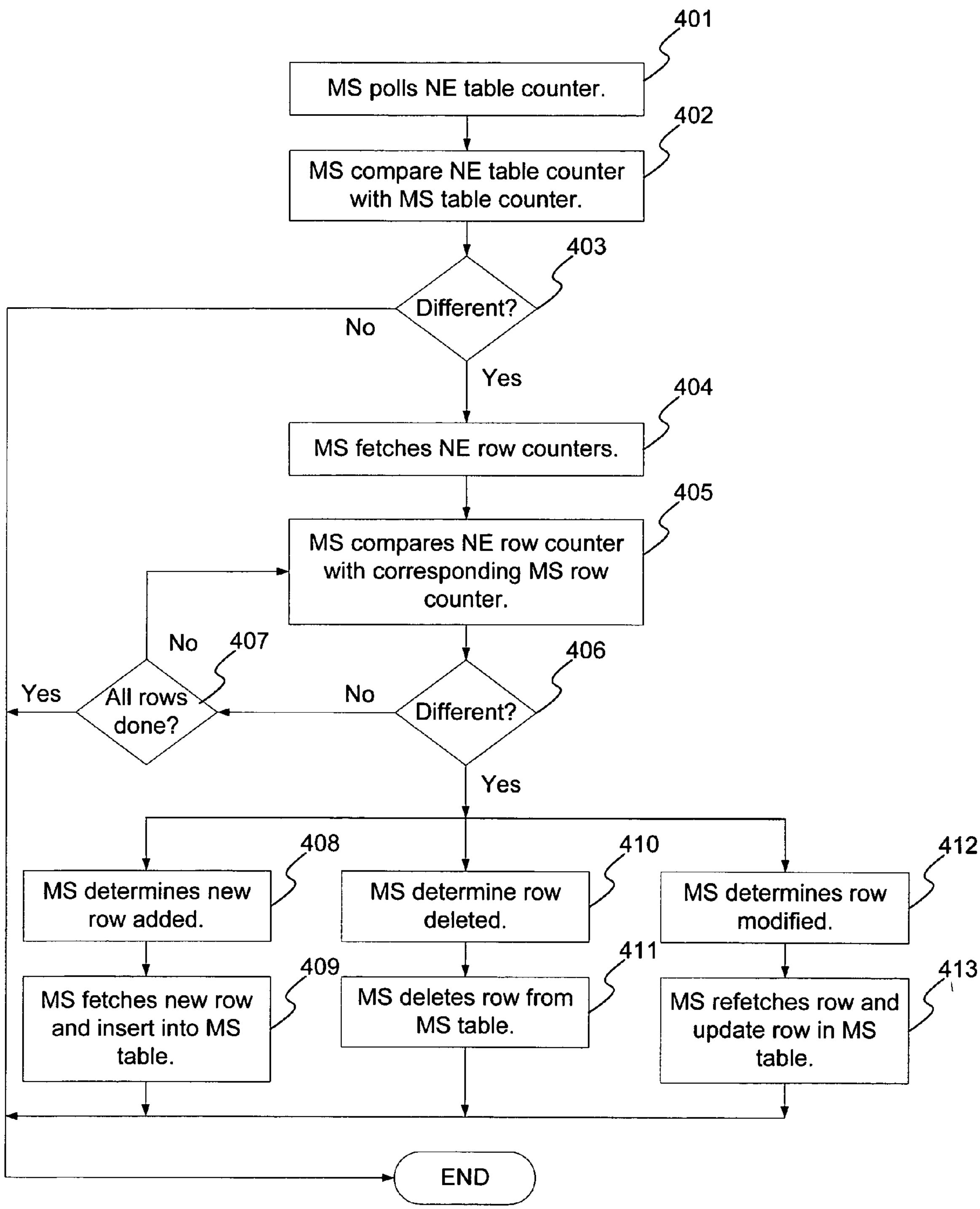
FIG. 4 is a flowchart illustrating in more detail the method for synchronizing data on a management system with data on network elements in an optical network in accordance with the present invention.

FIG. 4 is a flowchart illustrating in more detail the method for synchronizing data on a management system with data on network elements in an optical network in accordance with the present invention. First, the MS 204 polls the NE table counter 202, via step 401. The MS 204 compares the NE table counter 202 with the MS table counter 205, via step 402. The MS 204 then determines if the values of the counters are different, via step 403, i.e., if the value of the NE table counter 202 is not what the MS 204 expected. If not, then the data in the NE table 207 has not changed since the last synchronization and no further action is necessary. If the values of the counters are different, then the MS 204 fetches the NE row counters 203, via step 404. The MS 204 then compares each NE row counter 203 with its corresponding MS row counter 206, via step 405. If the value of a MS row counter 206 is determined to be the same as its corresponding NE row counter 203, via step 406, then that row has not changed since the last synchronization. The process then continues with the next row.

If the value of a MS row counter 206 is determine to be different than its corresponding NE row counter 203, via step 406, i.e., the value of the NE row counter 203 is not what the MS 204 expected, then the row has changed since the last synchronization. The MS 204 next determines what type of change occurred. If the row is determined to be a new row added to the NE table 207, via step 408, then the MS 204 fetches the new row and inserts its image into the MS table 208, via step 409. If the row is determined to have been deleted from the NE table 207, via step 410, then the MS 204 deletes the row's image from the MS table 208, via step 411. In the preferred embodiment, the NE row counters 203 are indexed. By examining the index, the MS 204 can determine if a row has been added or deleted. If the MS 204 determines that the row has been modified, via step 412, then the MS 204 re-fetches the row from the NE table 207 and updates the row's image in the MS table 208, via step 413. Steps 405 through 413 are repeated until all rows counters have been compared. Steps 401 through 413 are repeated for each network element in the network that requires data synchronization with the MS 204.

Figure 5:
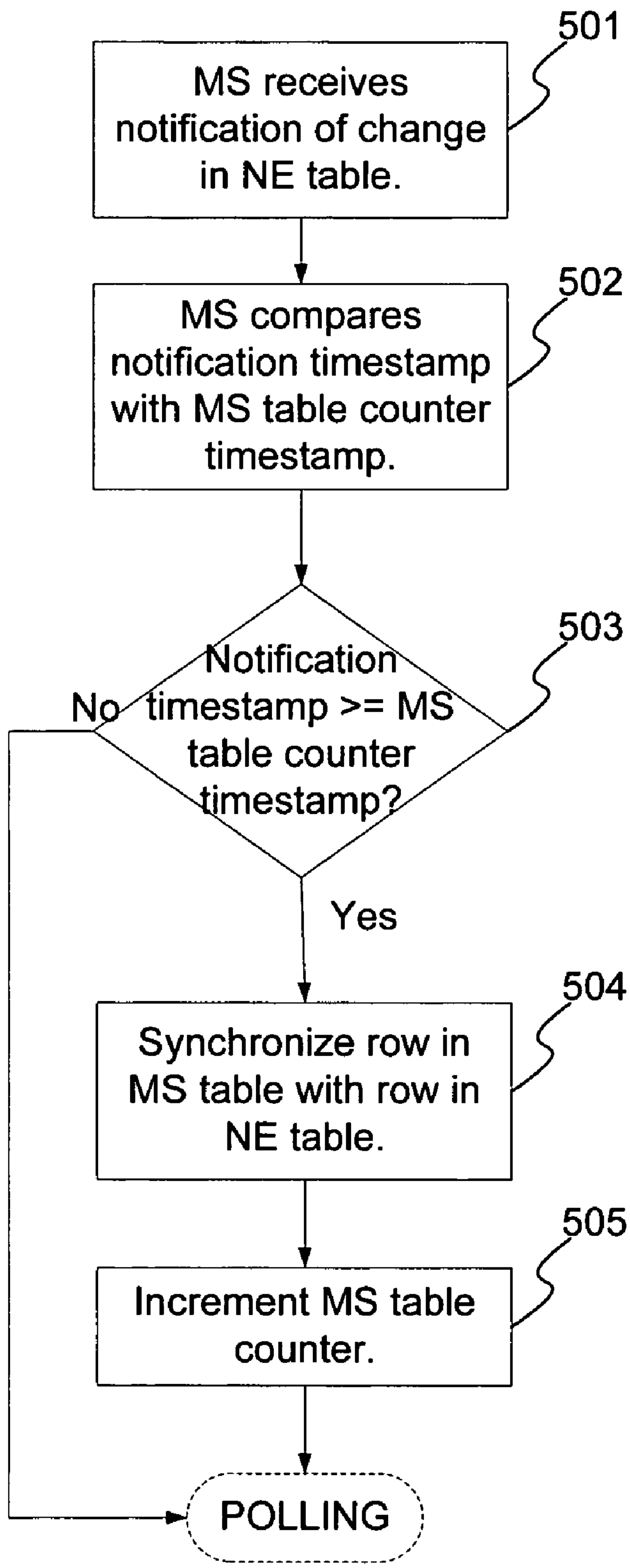
FIG. 5 is a flowchart illustrating the first method of incrementing the MS table counter in accordance with the present invention.

In the preferred embodiment, the MS table counter 205 can be incremented in one of two ways. FIG. 5 is a flowchart illustrating the first method of incrementing the MS table counter 205 in accordance with the present invention. In this first method, a MS table counter timestamp and a notification timestamp are used. The MS table counter timestamp indicates the last time at which the MS table 208 was synchronized. The notification timestamp indicates when the notification was sent. The notification provides information about what row has been added, deleted, or modified. When the MS 204 receives a notification of a change in the table 207 at the network element 201, via step 501, the MS 204 compares the notification timestamp with the MS table counter timestamp, via step 502. If the notification timestamp is determined to be greater than or equal to the MS table counter timestamp, via step 503, then the MS 204 synchronizes the row in the MS table 208 with the row added/deleted/modified at the NE table 207, via step 504. The MS table counter 205 is then incremented, via step 505. Note that when the row at the NE table 207 was changed, the table counter 202 at the NE 201 was also incremented.

The MS 204 can then perform the polling as described in FIGS. 3 and 4. If during this polling process, the MS table counter 205 value is different from the NE table counter 202 value, then a change in the NE table 207 was missed by the MS 204. For example, a notification could have been lost, or a row was deleted and recreated by the NE 201. However, with the present invention, synchronization of the tables 207 and 208 can still be maintained.

Figure 6:
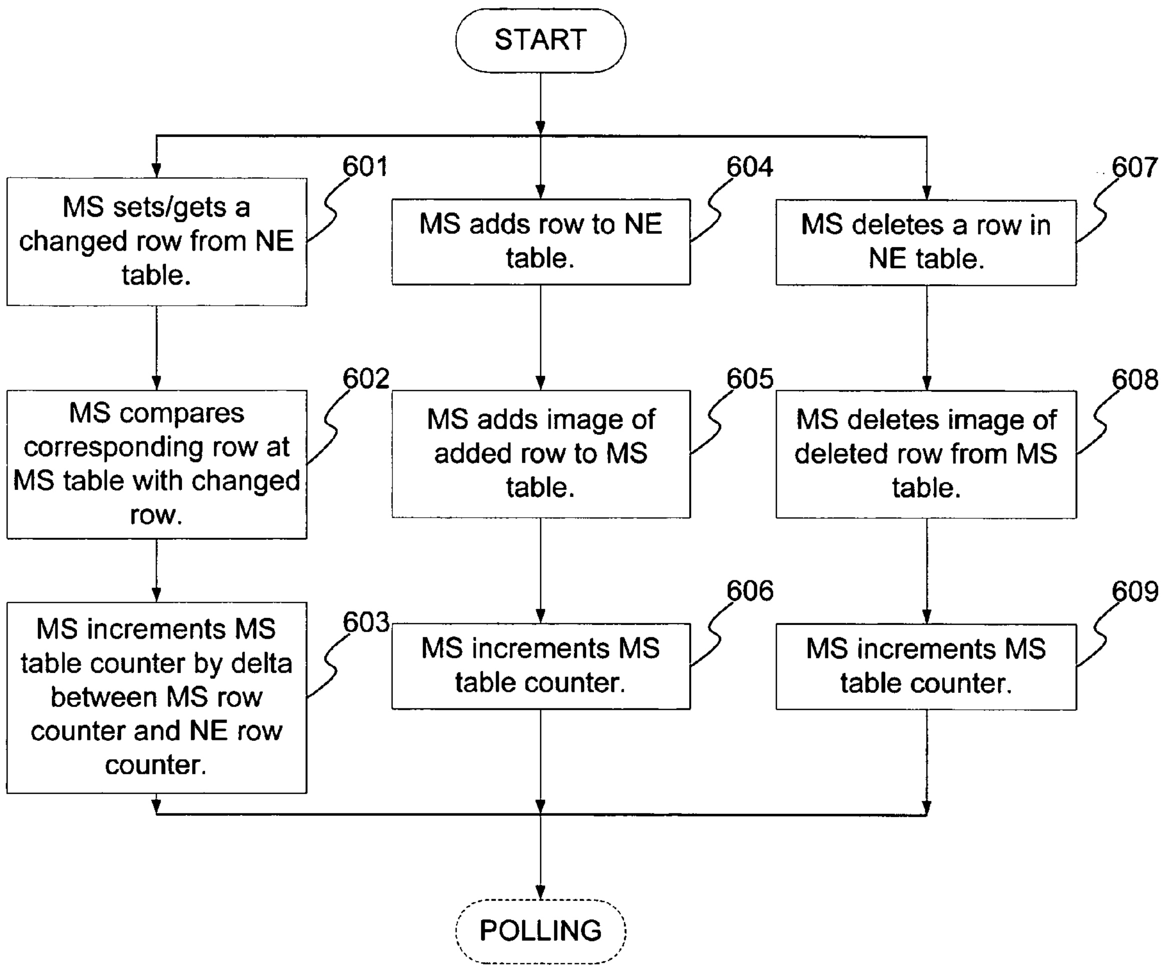
FIG. 6 is a flowchart illustrating the second method of incrementing the MS table counter in accordance with the present invention.

FIG. 6 is a flowchart illustrating the second method of incrementing the MS table counter in accordance with the present invention. In the second method, network resources can be reserved by having the MS 204 increment its table counter 205 when the MS 204 itself initiates a change in the NE table 207. When the MS 204 sets or gets a changed row from the NE table 207, via step 601, the corresponding row at the MS table 208 is compared with the changed row from the NE table 207, via step 602. The MS row counter 206 is then incremented by the delta between the MS row counter and the NE row counter 203, via step 603. When the MS 604 creates or adds a row to a NE table 207, via step 604, the MS 204 adds an image of this row to the MS table 208, via step 605, and increments the MS table counter 205, via step 606. When the MS 604 deletes a row in the NE table 207, via step 606, the MS 204 also deletes the corresponding row from the MS table, via step 608, and increments the MS table counter, via step 609.

The MS 204 can then perform the polling as described in FIGS. 3 and 4. If during this polling process, the MS table counter 205 value is different from the table counter 202 value, then a change in the NE table 207 occurred that was not initiated by the MS 204. The MS 204 can then synchronize the tables 207 and 208 by fetching these changes.

In the preferred embodiment, the management system uses either the first method (FIG. 5) or the second method (FIG. 6) for any given table. For example, there are tables (e.g. an alarm table) where entries are created and deleted autonomously by the network element. For these tables, the first method is used. Here, the network element usually sends notifications when these tables change. On the other hand, there are tables (e.g. service tables) where the entries are created/deleted/modified usually via user command. For these tables, the management system uses the second method.

Optionally, the MS 204, in addition to the above, can periodically check if each NE 201 in the network is "alive". This is to avoid the situation where the MS 204 polls the table counter 202 which has the value X. Then, the NE 201 reboots, and its table counter 202 increments back up to X before the table counter 202 is polled again. Here, the MS 204 will mistakenly believe that no changes in the NE table 207 occurred since the last synchronization. By periodically checking if each NE 201 in the network is "alive", the MS 204 will know when a NE 201 reboots. When the NE 201 begins responding again, the MS 204 can re-fetch all the data in the NE table 207.

An improved method and system for synchronizing data on a management system with data on network elements in an optical network have been disclosed. The present invention utilizes a table counter at the network element, row counters for each row in the NE table, a table counter at the management system, and a row counter for each row in the MS table copy. The table counter at the network element increments when a change in the NE table occurs. Each row counter increments when its row is changed. The MS table counter increments when a change to the MS table occurs. They change can be initiated by a notification of a change in the NE table is received by the management system, or when the management system initiates the change. Each MS row counter is incremented when its row is changed. The management system then periodically polls the NE table counter and compares it with its table counter. If the two are different, then the management system fetches the row counters for the NE table. Each NE row counter is then compared with the corresponding MS row counter in the MS table. If any of the row counters do not match, then that row in the MS table is synchronized with the row in the NE table. In this manner, the synchronization of data between network elements and the management system is maintained without unnecessary notifications to the management system, without overburdening network resources, and provides greater scalability.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for synchronizing data on a management system (MS) with data on at least one network element in an optical network, the method comprising:

(a) incrementing a MS table counter each time a change occurs in a MS table, wherein the change in the MS table is made when the MS receives a notification of a change in a network element (NE) table on the at least one network element;

(b) incrementing a NE table counter each time a change occurs in the NE table;

(c) polling the NE table counter;

(d) determining if the NE table counter equals the MS table counter, wherein if the NE table counter does not equal the MS table counter, then a notification was missed by the MS;

(e) fetching a row counter from the NE table, if the NE table counter does not equal the MS table counter, wherein the NE row counter corresponds to a row in the NE table;

(f) determining if the NE row counter equals a corresponding MS row counter;

(g) synchronizing a row in the MS table with the row in the NE table, if the NE row counter does not equal the corresponding MS row counter.

2. The method of claim 1, wherein the incrementing (a) comprises:

(a1) receiving the notification by the MS of the change in the row in the NE table;

(a2) comparing a notification timestamp with a MS table counter timestamp;

(a3) synchronizing the row in the MS table with the row in the NE table, if the notification timestamp is greater than or equal than the MS table counter timestamp; and (a4) incrementing the MS table counter.

3. The method of claim 1, wherein the fetching (e) comprises:

(e1) fetching a plurality of NE row counters from the NE table, wherein each NE row counter corresponds to one of a plurality of rows of the NE table.

4. The method of claim 1, wherein the incrementing (a) comprises:

(a1) adding a new row to the NE table by the MS;

(a2) adding a copy of the new row to the MS table; and (a3) incrementing the MS table counter.

5. The method of claim 1, wherein the synchronizing (g) comprises:

(g1) determining that the NE row counter does not equal the corresponding MS row counter;

(g2) determining that the row in the NE table was added to the NE table; and (g3) fetching the added row and inserting a copy of the added row into the MS table.

6. The method of claim 1, wherein the synchronizing (g) comprises:

(g1) determining that the NE row counter does not equal the corresponding MS row counter;

(g2) determining that the row in the NE table was deleted from the NE table; and (g3) deleting the row in the MS table corresponding to the deleted row.

7. The method of claim 1, wherein the synchronizing (g) comprises:

(g1) determining that the NE row counter does not equal the corresponding MS row counter;

(g2) determining that the row in the NE table was modified; and (g3) fetching the modified row and updating the row in the MS table copy corresponding to the modified row.

8. The method of claim 1, wherein the incrementing (a) comprises:

(a1) deleting a row in the NE table by the MS;

(a2) deleting a row in the MS table corresponding to the deleted row; and (a3) incrementing the MS table counter by the MS.

9. A method for synchronizing data on a management system (MS) with data on at least one network element in an optical network, the method comprising:

(a) incrementing a MS table counter each time a change occurs in a MS table, comprising:

(a1) setting a changed row from a network element (NE) table on the at least one network element by the MS;

(a2) comparing the changed row with a corresponding row in a MS table;

(a3) determining a delta between a MS row counter for the row in the MS table and a NE row counter for the changed row; and (a4) incrementing a MS table counter by the delta;

(b) incrementing a NE table counter each time a change occurs in the NE table;

(c) polling the NE table counter corresponding to the NE table;

(d) determining if the NE table counter equals a first expected value;

(e) fetching a row counter from the NE table, if the NET table counter does not equal the first expected value, wherein the NE row counter corresponds to a row in the NE table;

(f) determining if the NE row counter equals a second expected value; and (g) synchronizing a row in the MS table with the row in the NE table, if the NE row counter does not equal the second expected value.

10. A computer readable medium embedded with a computer executable program including instructions for synchronizing data on a management system (MS) with data on at least one network element in an optical network, comprising the instructions for:

(a) incrementing a MS table counter each time a change occurs in a MS table, wherein the change in the MS table is made when the MS receives a notification of a change in a network element (NE) table on the at least one network element;

(b) incrementing a NE table counter each time a change occurs in the NE table;

(c) polling the NE table counter;

(d) determining if the NE table counter equals the MS table counter;

(e) fetching a row counter from the NE table, if the NE table counter does not equal the MS table counter, wherein the NE row counter corresponds to a row in the NE table;

(f) determining if the NE row counter equals a corresponding MS row counter;

(g) synchronizing a row in MS table with the row in the NE table, if the NE row counter does not equal the corresponding MS row counter.

11. The medium of claim 10, wherein the synchronizing instruction (g) comprises:

(g1) determining that the NE row counter does not equal the corresponding MS row counter;

(g2) determining that the row in the NE table was deleted from the NE table; and (g3) deleting the row in the MS table corresponding to the deleted row.

12. The medium of claim 10, wherein the synchronizing instructions (g) comprises:

(g1) determining that the NE row counter does not equal the corresponding MS row counter;

(g2) determining that the row in the NE table was modified; and (g3) fetching the modified row and updating the row in the MS table copy corresponding to the modified row.

13. The medium of claim 10, wherein the incrementing instructions (a) comprises:

(a1) receiving the notification by the MS of the change in the row in the NE table;

(a2) comparing a notification timestamp with a MS table counter timestamp;

(a3) synchronizing the row in the MS table with the row in the NE table, if the notification timestamp is greater than or equal than the MS table counter timestamp; and (a4) incrementing the MS table counter.

14. The medium of claim 10, wherein the incrementing instructions (a) comprises:

(a1) adding a new row to the NE table by the MS;

(a2) adding a copy of the new row to the MS table; and (a3)incrementing the MS table counter.

15. The medium of claim 10, wherein the fetching (e) comprises:

(e1) fetching a plurality of NE row counters from the NE table, wherein each NE row counter corresponds to one of a plurality of rows of the NE table.

16. The medium of claim 10, wherein the incrementing instructions (a) comprises:

(a1) deleting a row in the NE table by the MS;

(a2) deleting a row in the MS table corresponding to the deleted row; and (a3)incrementing the MS table counter by the MS.

17. The medium of claim 10, wherein the synchronizing instruction (g) comprises:

(g1) determining that the NE row counter does not equal the corresponding MS row counter;

(g2) determining that the row in the NE table was added to the NE table; and (g3) fetching the added row and inserting a copy of the added row into the MS table.

18. A computer readable medium embedded with a computer executable program including instructions for synchronizing data on a management system (MS) with data on at least one network element in an optical network, comprising instructions for:

(a) incrementing a MS table counter each time a change occurs in a MS table, comprising:

(a1) setting a changed row from a network element (NE) table on the at least one network element by the MS;

(a2) comparing the changed row with a corresponding row in a MS table;

(a3) determining a delta between a MS row counter for the row in the MS table and a NE row counter for the changed row; and (a4) incrementing a MS table counter by the delta;

(b) incrementing a NE table counter each time a change occurs in the NE table;

(c) polling the NE table counter corresponding to the NE table;

(d) determining if the NE table counter equals a first expected value;

(e) fetching a row counter from the NE table, if the NET table counter does not equal the first expected value, wherein the NE row counter corresponds to a row in the NE table;

(f) determining if the NE row counter equals a second expected value; and (g) synchronizing a row in the MS table with the row in the NE table, if the NE row counter does not equal the second expected value.

19. A system, comprising:

a network element (NE), comprising:

a first table, comprising a first plurality of rows and a plurality of NE row counters, wherein each NE row counter corresponds to one of the rows in the first table, and a first table counter; and a management system (MS), comprising:

a second table corresponding to the first table, comprising a second plurality of rows and a plurality of MS row counters, wherein each MS row counter corresponds to a row in the second table, and a second table counter, wherein the second table counter is incremented each time a change occurs in the second table, wherein the change in the second table is made when the MS receives a notification of a change in the first table, wherein the management system maintains the second table in synchronization with the first table by:

polling the first table counter, comparing the first table counter to the second table counter, fetching the first plurality of row counters, if the first table counter does not equal the second table counter, wherein if the first table counter does not equal the second table counter, then a notification was missed by the MS, comparing each NE row counter with the corresponding MS row counter, and for each MS row counter that does not equal its NE row counter, synchronizing the row corresponding to the MS row counter with the row corresponding to the NE row counter.

20. A system, comprising:

a network element (NE), comprising:

a first table, comprising a first plurality of rows and a plurality of NE row counters, wherein each NE row counter corresponds to one of the rows in the first table, and a first table counter; and a management system (MS), comprising:

a second table corresponding to the first table, comprising a second plurality of rows and a plurality of MS row counters, wherein each MS row counter corresponds to a row in the second table, and a second table counter, wherein the second table counter is incremented each time a change occurs in the second table by:

setting a changed row from the first table, comparing the changed row with a corresponding row in the second table, determining a delta between a MS row counter for the row in the second table and a NE row counter for the changed row, and incrementing the second table counter by the delta, wherein the management system maintains the second table in synchronization with the first table by:

polling the first table counter, comparing the first table counter to the second table counter, fetching the first plurality of row counters, if the first table counter does not equal the second table counter, comparing each NE row counter with the corresponding MS row counter, and for each MS row counter that does not equal its NE row counter, synchronizing the row corresponding to the MS row counter with the row corresponding to the NE row counter.

* * * * *